Feb. 14, 1956 — L. D. BIZAK — 2,734,531
HYDRAULIC ACCUMULATORS
Filed Sept. 25, 1952

INVENTOR.
LOUIS D. BIZAK
BY John N. Wolfram
Attorney

United States Patent Office 2,734,531
Patented Feb. 14, 1956

2,734,531

HYDRAULIC ACCUMULATORS

Louis D. Bizak, Wickliffe, Ohio, assignor to The Parker Appliance Company, Cleveland, Ohio, a corporation of Ohio Application September 25, 1952, Serial No. 311,460

7 Claims. (Cl. 138—31)

This invention relates to hydraulic accumulators, and more particularly to accumulators of the piston type. Accumulators are used in hydraulic systems for several different purposes. For example, they may be used for storing a quantity of the hydraulic fluid under pressure to be made available for emergency operation of a fluid operated device in the event of failure of the normal source of fluid pressure. Another use is to provide an air cushion for smoothing out shock pressures in the liquid part of the hydraulic system and to assist in maintaining the liquid at a more uniform pressure.

The present accumulator has been particularly designed for aircraft installations, although of course it may be used in other installations to advantage. Aircraft installations pose two main problems which are best solved by the use of a piston type accumulator as opposed to the more conventional spherical type having a rubber diaphragm separating the sphere into two halves. One of these problems concerns operation at low temperatures and the other is the physical space problem in installing the accumulator in the airplane.

Spherical type accumulators which use a flexible rubber diaphragm for separating the air and liquid chambers are not satisfactory for low temperature operations because the rubber diaphragms lose their flexibility and either become too stiff to properly operate or will rupture when the fluid pressure flexes the cold diaphragm. Piston type accumulators are more adaptable to low temperature operation since they utilize a sliding metal piston rather than a flexible diaphragm to separate the air and oil chambers. Also, piston type accumulators can be fitted into aircraft wing sections and other locations with limited space since they can be made in cylindrical shapes of various diameter and length combinations.

Heretofore it has been difficult to utilize the above mentioned advantages of the piston type accumulators for aircraft installations largely because of the problem of providing an effective packing arrangement for the sliding piston.

The piston separates the hydraulic liquid chamber from the air chamber and must be able to seal when the air and liquid pressures are the same on opposite sides of the packing and also when either the air or the hydraulic liquid is momentarily higher than the other. Furthermore, the packing must be readily slidable in the cylinder bore so that the piston may move in response to pressure differentials between the air and hydraulic sides.

In the ideal condition the cylinder bore should be straight, smooth, and of uniform diameter throughout so that the relation of the packing to the cylinder wall will be the same regardless of the position within the bore. This requires that expansion or other deformation of the cylinder wall be avoided during both assembly and operation.

The present invention seeks to overcome the above mentioned difficulties by forming the accumulator with a double shell in which the outer shell provides the necessary burst strength to contain the fluids and in which the inner shell is initially provided with the characteristics for proper cooperation with the piston packings and is so mounted that it is substantially free of any strains during assembly and operation which would alter these characteristics.

More specifically, it has been an object to provide a double shell accumulator of the piston type in which the entire portion of the inner shell which is traversed by the packings in the piston is pressure balanced on the inner and outer surfaces so that air and liquid pressure will not distort the inner shell whereby interference with the free sliding and sealing of the piston will be avoided.

It is another object to provide an accumulator of the type described in which the inner shell is so mounted within the outer shell as to be free of any substantial mechanically imposed stresses and also free of any mechanical attachment to the outer shell whereby manufacture, assembly, and disassembly is facilitated.

It is another object to provide a double shell piston accumulator in which the inner shell is devoid of any mechanical attachment to the outer shell and is located with respect thereto in the longitudinal direction by a spring.

Other objects will be apparent from the ensuing detailed description and from the drawings in which.

Figures 1, 2:
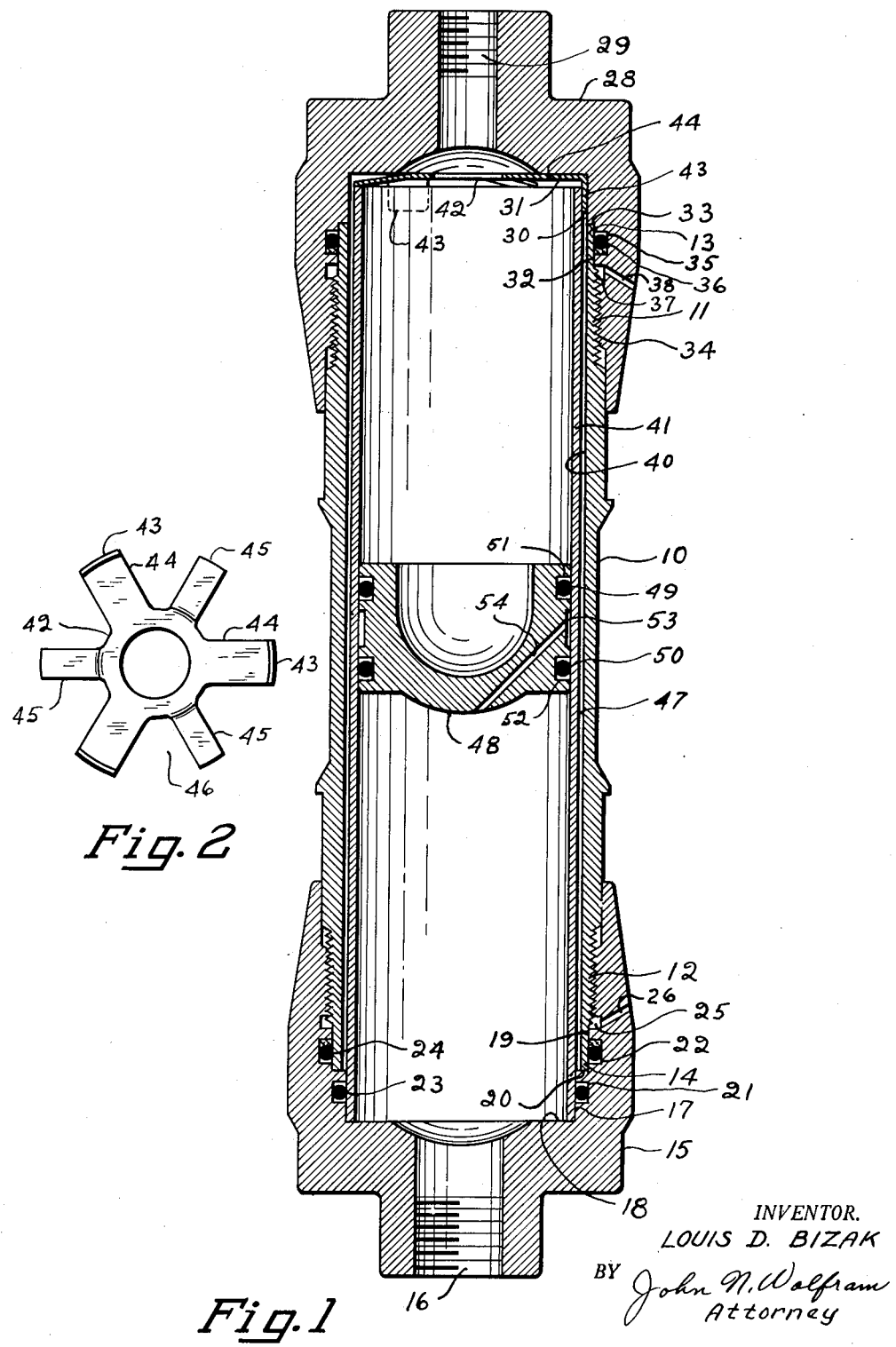
Figure 1 is a longitudinal cross-section view.
Figure 2 is a plan view of the spring which locates the inner shell within the outer shell.

The accumulator includes a cylindrical outer shell 10 having threaded ends 11 and 12 terminating in smooth cylindrical extensions 13 and 14. On one end of the outer shell there is mounted an end cap 15 having an inlet port 16 to which may be attached a tubing line leading to a hydraulic system.

The end cap 15 has a counterbore 17 terminating in a transverse abutment face 18 and it also has a second counterbore 19 threaded toward its outer end and terminating in its inner end in an abutment face 20. Packing grooves 21 and 22 are formed in the counterbores 18 and 19 and contain packings 23 and 24 respectively. An additional groove 25 is formed adjacent the packing groove 22 and is vented to the exterior by a drilled hole 26.

The second end cap 28 is mounted on the other end of the outer shell and is provided with a port 29 through which air under pressure may be introduced. This end cap is the same as the one on the opposite end except that the packing and packing groove corresponding to 21 and 23 in the end cap 15 are omitted. Thus the cap 28 includes a counterbore 30 terminating in an abutment face 31 and also having a second counterbore 32 terminating in an abutment face 33 and having a thread 34 at its outer end. The cap has a packing groove 35 in which is contained a packing 36 and it also has a groove 37 vented to the exterior by means of the drilled hole 38.

The outer shell 10 has a cylindrical bore 40 within which is mounted a tubular inner shell 41. One end of the latter fits within the counterbore 17 of the end cap 15 and abuts the surface 18. It is also engaged by the packing ring 23. The other end of the inner shell 41 abuts the spring member 42 and is centered by the inwardly turned end 43 of the spacer fingers 44. The spring fingers 45, more clearly shown in Figure 2, yieldingly urge the inner shell 41 against the abutment face 18 of the end cap 15. The spring element 42 is provided with spaces 46 between the fingers 43 and 44 for permitting air under pressure within the accumulator to pass from the interior of the inner shell 41 to the small annular clearance 47 between the two shells.

The inner shell is of such length that when the end caps 15 and 28 are threaded upon the outer shell until the abutment faces 20 and 33 are each in firm engagement with the respective end of the outer shell the abutment faces 18 and 31 of the end caps will be spaced apart a distance somewhat greater than the length of the inner shell plus the thickness of the spring element 42. The difference in these distances is taken up by the spring fingers 44 so that the inner shell is yieldingly retained in a fixed position.

Within the inner shell 41 there is mounted a freely slidable piston 48 which carries two packing rings 49 and 50 mounted in grooves 51 and 52. Between the packing grooves there is another groove 53 which is connected to one side of the piston by a drilled hole 54.

In operation air is introduced in a desired amount through the port 29 in the end cap 28 and the port is then plugged by a suitable means, not shown. The port 16 in the end cap 15 is then connected to a hydraulic system and the liquid pressure from the latter will move the piston 18 toward the air side of the accumulator and compressing the air until it is at substantially the same pressure as the hydraulic liquid. Because of the connection between the air side of the interior of the inner shell 41 with the annular clearance 47 by means of the spaces 46 between the spring fingers 45, the entire outer surface of the inner shell on the air side of the packing 23 will be subjected to substantially the same pressure as the interior surface. Likewise, the short section of the inner shell on the hydraulic side of the packing 23 is subject to equal liquid pressures on the inner and outer surfaces.

The packings 24 and 36 prevent the leakage of the air under pressure within the accumulator through the threaded joints between the end caps and the outer shell to the atmosphere. The packing 23 seals the air within the clearance 47 to prevent it from passing to the hydraulic liquid side of the accumulator from which it might otherwise pass through the port 16 into the hydraulic system.

Meanwhile, hydraulic liquid passes through the port 54 into the groove 53 and gains access to the sides of the two packings 49 and 50 facing the groove 53. At the same time, air under pressure acts on the opposite side of the packing 49 and liquid from the hydraulic side of the accumulator acts on the opposite side of the packing ring 50. Since all of these pressures are normally substantially equal to each other each of the packings 49, 50 will be in a pressure balanced state, except that each of the packings will tend to be compressed between the opposite acting fluids in such a manner that each ring will tend to expand both radially outwardly and radially inwardly for obtaining a tight seal. Because the pressures are balanced on each side of the packings there will be no tendency for the packings to extrude and wedge into the small clearance between the piston and inner shell and thus jamming and sticking of the piston is avoided.

The introduction of hydraulic fluid under pressure to the groove 53 not only serves to permit balancing of the pressures on opposite sides of each of the packing rings 49 and 50, but it also permits fluid pressure to act upon the portion of the inner shell 41 between the latter mentioned packing rings and thus balance the air pressure acting in the clearance 47 upon the corresponding outer surface of the shell 41.

It will be noted that every portion of the outer surface of the inner shell 41 which is subject to air pressure on the one side of the packing 23 and to liquid pressure on the other side of the packing 23 is opposed by an internal surface subject to either a corresponding air or hydraulic liquid pressure or to a pressure exerted by the packings 49, 50. Likewise, the external surface of the inner shell 41 which is acted upon by the packing ring 23 is opposed by an internal surface subject to the pressure of the hydraulic liquid. Thus all of the radial surfaces of the inner shell 41 are in a pressure balanced condition and there is no tendency for the inner shell to either expand or contract radially at any point. Since there is no radial expansion or contraction the clearance between the piston 48 and the inner diameter of the shell 41 remains constant and the sealing characteristics of the packings 49 and 50 remain constant regardless of the longitudinal position of the piston 48 within the inner shell.

Likewise, since the length of the inner shell 41 is slightly less than the distance between the faces 18 and 31 plus the thickness of the spring element 42, when the end caps are completely threaded into place with the faces 20 and 33 in contact with the respective ends of the outer shell 10, the inner shell is not subjected to any longitudinally compressive stresses except those imposed by the spring fingers 45. The latter may be readily predetermined and controlled and thus buckling or distortion of the inner shell when the end caps are threaded into place is avoided.

Since the internal shell 41 is not subjected to any unbalanced pressures nor to any uncontrolled mechanical stresses it may be made of relatively thin section. By avoiding any positive attachment to either of the end caps or of the outer shell 10, such as by threading or welding, the design of the inner shell is simplified so that it may be in the form of a simple tube. Likewise, the lack of a positive attachment permits ready assembly and disassembly of the parts during manufacture and servicing. The arrangement is such that all of the packings are easily accessible for periodic replacement, as is required in standard aircraft maintenance procedure.

Because of the sliding piston type arrangement, it is essential that the bore of the inner shell 41 be smooth and straight throughout its length. To get the proper degree of smoothness a honing operation is required. This is a relatively expensive operation and is the one which results in the greatest degree of spoilage of parts during manufacture. Since the part to which it is applied is in the form of a simple tube and therefore relatively inexpensive, spoilage due to the honing operation occurs on a part which is relatively cheap. If the inner and outer shell type construction is not used, this operation would have to be performed on the outer shell which is basically a more expensive part and in which the dollar loss due to honing spoilage would otherwise be much greater.

From the foregoing it is apparent that because of the complete balancing of internal and external fluid pressures upon the inner shell and the avoidance of material stresses in the longitudinal direction thereupon, and also because of the balanced fluid pressures upon the packings 49 and 50, the sliding and sealing characteristics of the piston and its packings remain substantially constant for every position of the piston within the inner shell and hence an effective seal between the air and liquid sides of the piston will be maintained.

I claim:

1. In a piston type accumulator, a cylindrical casing, closure caps secured to the ends of the casing and having an inner transverse wall, each wall providing an abutment face, an inner shell within said casing spaced therefrom to provide an annular chamber having its ends opposite said faces, the distance between said faces being slightly greater than the distance between the ends of the inner shell, a resilient member between one face and one end of the inner shell for yieldably urging the other end of the inner shell against the other of said faces, a movable piston within the inner shell, and a port leading to one end of said inner shell.

2. In a piston type accumulator, a cylindrical casing, closure caps secured to the ends of the casing and each having an inner transverse wall providing an abutment, an inner shell detachably mounted within said casing and spaced therefrom to form therewith an annular chamber, said shell having its ends opposite said abutments, the distance between said abutments being slightly greater than the length of the inner shell, a resilient member between one abutment and one end of the inner shell for yieldingly holding the opposite end of said shell against the opposite abutment, a movable piston within the inner shell, a port leading to one end of said inner shell, and a packing at one end of the inner shell making sealing contact with the inner shell and the adjacent cap.

3. In a piston type accumulator, a cylindrical casing, closure caps secured to the ends of the casing and each having an inner transverse wall providing an abutment, an inner shell within said casing, spaced therefrom to form therewith an annular chamber, and having its ends opposite said abutments, the distance between said abutments being slightly greater than the length of the inner shell, a resilient member between one abutment and one end of the inner shell for yieldingly holding the opposite end of said shell against the opposite abutment, a movable piston within the inner shell, a port leading to one end of said inner shell, a packing at one end of the inner shell making sealing contact with the shell and the adjacent cap, said packing being spaced from the end of the inner shell a distance greater than the difference between the length of the shell and the distance between said abutments.

4. In a piston type accumulator, a cylindrical outer shell, a cap mounted on each end of the outer shell and each cap having an abutment shoulder in contact with the respective end of the outer shell, a transverse face on each cap, an inner shell within the outer shell and smaller than the outer shell to form an annular space therebetween, the ends of said inner shell being opposite said faces, the distance between said faces being greater when the ends of the outer shell are engaged by the abutment shoulders than the distance between said ends of the inner shell, a resilient member between one abutment face and one end of the inner shell, a resilient member between one abutment face and one end of the inner shell for yieldingly urging the other end of the inner shell against the other of said abutment faces, a movable piston within the inner shell, and a port in one of said caps leading to one end of the inner shell.

5. In a piston type accumulator, a cylindrical outer shell, a cap mounted on each end of the outer shell and each cap having an abutment shoulder in contact with the respective end of the outer shell, a transverse face on each cap, the face on one cap being longitudinally offset from the abutment shoulder on that cap, an inner shell within the outer shell and smaller than the outer shell to form an annular space therebetween, the ends of said inner shell being opposite said faces, the distance between said faces being greater when the ends of the outer shell are engaged by the abutment shoulders than the distance between said ends of the inner shell, a resilient member between one abutment face and one end of the inner shell for yieldingly urging the other end of the inner shell against the other of said abutment faces, a packing between said inner shell and said one cap and intermediate said offset face and abutment shoulder, a movable piston within the inner shell, and a port in one of said caps leading to one end of the inner shell.

6. In a piston type accumulator, a cylindrical casing including a transverse wall at each end thereof, each wall providing an abutment face, an inner shell within said casing and having its ends opposite said faces, a distance between said faces being slightly greater than the distance between the ends of the inner shell, a spring between one face and one end of the inner shell for yieldably urging the other end of the inner shell against the other of said faces, a packing at the other end of the inner shell between the inner shell and the casing, a movable piston within the inner shell, and a port leading to one end of the inner shell.

7. In a piston type accumulator, a cylindrical casing including a transverse wall at each end thereof, each wall providing an abutment face, an inner shell within said casing and having its ends opposite said faces, a spring washer between one end of the inner shell for yieldably urging the other end of the inner shell against the other of said faces, said washer including circumferentially spaced fingers projecting between the casing and the outer diameter of the inner shell, a movable piston within the inner shell, and a port leading to one end of said inner shell.

References Cited in the file of this patent

UNITED STATES PATENTS

| | | |
|---|---|---|
| 2,352,041 | Van Den Berg | June 20, 1944 |
| 2,417,873 | Huber | Mar. 25, 1947 |